United States Patent
Caragine (10) Patent No.: US 7,554,215 B1
(45) Date of Patent: Jun. 30, 2009

(54) GENERATOR AND METHOD FOR GENERATING ELECTRICITY FROM SUBSURFACE CURRENTS

(76) Inventor: Paul Caragine, 1 Sawmill Rd., Kinnelon, NJ (US) 07405

( * ) Notice: Subject to any disclaimer, the term of this patent is extended or adjusted under 35 U.S.C. 154(b) by 174 days.

(21) Appl. No.: 11/772,933

(22) Filed: Jul. 3, 2007

(51) Int. Cl.
F03B 13/10 (2006.01)
F03B 13/12 (2006.01)

(52) U.S. Cl. ............................. 290/42; 290/43; 290/53
(58) Field of Classification Search ............. 290/42–43, 290/53
See application file for complete search history.

(56) References Cited

U.S. PATENT DOCUMENTS

| | | | | |
|---|---|---|---|---|
| 1,439,984 | A | | 12/1922 | Talbert ....................... 417/330 |
| 3,496,871 | A | * | 2/1970 | Stengel .................... 417/410.1 |
| 3,696,251 | A | | 10/1972 | Last et al. ..................... 290/53 |
| 3,859,789 | A | * | 1/1975 | Fawcett et al. ................. 60/235 |
| 3,927,329 | A | * | 12/1975 | Fawcett et al. .............. 290/1 R |
| 4,002,416 | A | * | 1/1977 | Axford ....................... 417/330 |
| 4,110,630 | A | * | 8/1978 | Hendel ......................... 290/53 |
| 4,170,738 | A | * | 10/1979 | Smith .......................... 290/42 |
| 4,291,234 | A | | 9/1981 | Clark .......................... 290/53 |
| 4,321,020 | A | * | 3/1982 | Mittal ........................ 417/320 |
| 4,371,788 | A | * | 2/1983 | Smith, Jr. ..................... 290/42 |
| 4,484,082 | A | * | 11/1984 | Bucknam .................... 290/1 R |
| 4,718,232 | A | * | 1/1988 | Willmouth ................... 60/495 |
| 4,748,808 | A | * | 6/1988 | Hill ............................. 60/398 |
| 4,843,249 | A | | 6/1989 | Bussiere ....................... 290/53 |
| 4,864,152 | A | | 9/1989 | Pedersen ...................... 290/53 |
| 5,001,357 | A | * | 3/1991 | Adams ........................ 290/1 R |
| 5,105,094 | A | | 4/1992 | Parker ......................... 290/53 |
| 5,440,176 | A | | 8/1995 | Haining ....................... 290/54 |
| 5,944,480 | A | * | 8/1999 | Forrest ......................... 415/5 |
| 6,020,653 | A | | 2/2000 | Woodbridge et al. .......... 290/53 |
| 6,184,590 | B1 | * | 2/2001 | Lopez ......................... 290/53 |
| 6,249,057 | B1 | * | 6/2001 | Lehet ......................... 290/1 R |
| 6,374,673 | B1 | * | 4/2002 | Schendel ................. 73/514.08 |
| 6,644,027 | B1 | * | 11/2003 | Kelly .......................... 60/498 |
| 6,729,744 | B2 | | 5/2004 | Mah .......................... 362/192 |
| 6,734,574 | B2 | * | 5/2004 | Shin .......................... 290/1 R |
| 6,809,427 | B2 | * | 10/2004 | Cheung et al. ............. 290/1 R |
| 6,812,583 | B2 | * | 11/2004 | Cheung et al. ............. 290/1 R |

(Continued)

OTHER PUBLICATIONS

Authors: Oskar Danielsson, Karin Thorburn, Mikael Eriksson and Mats Leijon, Title: Permanent Magnet Fixation Concepts for Linear Generator, Division for Electricity and Lightning Research, Department of Engineering Sciences, Uppsala University, Uppsala, Sweeden, Publication Date: Unknown.

(Continued)

Primary Examiner—Nicholas Ponomarenko
Assistant Examiner—Pedro J Cuevas
(74) Attorney, Agent, or Firm—Thomas L. Adams (57) ABSTRACT

A generator can convert the energy from subsurface currents or undertow into electricity. The generator has a submergible electrical coil adapted to allow water propelled by subsurface currents to enter and flow axially through the coil. The electrical coil is supported above a sea floor in substantial alignment with the subsurface currents. A magnetic shuttle is mounted to longitudinally reciprocate in the coil, driven by water flowing through the coil. Additionally, a plurality of electrical coils can be submerged above a sea floor. Magnetic shuttles are placed separately into a corresponding one of the coils to longitudinally reciprocate, driven by water flowing through the coils.

23 Claims, 5 Drawing Sheets

U.S. PATENT DOCUMENTS

| | | | | |
|---|---|---|---|---|
| 6,864,592 B1* | 3/2005 | Kelly | | 290/42 |
| 6,955,049 B2 | 10/2005 | Krouse | | 60/641.7 |
| 6,956,300 B2* | 10/2005 | Gizara | | 290/43 |
| 7,012,340 B2 | 3/2006 | Yi | | 290/42 |
| 7,023,104 B2* | 4/2006 | Kobashikawa et al. | | 290/42 |
| 7,042,112 B2 | 5/2006 | Wood | | 290/53 |
| 7,131,269 B2* | 11/2006 | Koivusaari | | 60/495 |
| 7,141,888 B2* | 11/2006 | Sabol et al. | | 290/53 |
| 7,164,212 B2* | 1/2007 | Leijon et al. | | 290/42 |
| 7,168,532 B2* | 1/2007 | Stewart et al. | | 188/161 |
| 7,199,481 B2* | 4/2007 | Hirsch | | 290/42 |
| 7,242,106 B2* | 7/2007 | Kelly | | 290/42 |
| 7,288,860 B2* | 10/2007 | Cheung et al. | | 310/12 |
| 7,304,399 B2* | 12/2007 | Leijon et al. | | 290/42 |
| 7,323,790 B2* | 1/2008 | Taylor et al. | | 290/42 |
| 7,355,293 B2* | 4/2008 | Bernhoff et al. | | 290/42 |
| 7,362,003 B2* | 4/2008 | Stewart et al. | | 290/42 |
| 7,405,489 B2* | 7/2008 | Leijon et al. | | 290/42 |
| 7,434,396 B2* | 10/2008 | McGahee | | 60/495 |
| 2003/0151258 A1* | 8/2003 | Shin | | 290/43 |
| 2003/0155771 A1* | 8/2003 | Cheung et al. | | 290/1 R |
| 2003/0197433 A1* | 10/2003 | Cheung et al. | | 310/14 |
| 2004/0007881 A1* | 1/2004 | Kobashikawa et al. | | 290/53 |
| 2004/0155467 A1* | 8/2004 | Cheung et al. | | 290/1 R |
| 2004/0251692 A1* | 12/2004 | Leijon et al. | | 290/42 |
| 2005/0029817 A1* | 2/2005 | Gizara | | 290/43 |
| 2005/0206247 A1* | 9/2005 | Stewart et al. | | 310/12 |
| 2005/0218728 A1* | 10/2005 | Stewart et al. | | 310/12 |
| 2005/0237775 A1* | 10/2005 | Sabol et al. | | 363/178 |
| 2007/0040384 A1* | 2/2007 | Bernhoff et al. | | 290/42 |
| 2007/0080539 A1* | 4/2007 | Kelly | | 290/42 |
| 2007/0090652 A1* | 4/2007 | Leijon et al. | | 290/53 |
| 2007/0283689 A1* | 12/2007 | McGahee | | 60/504 |
| 2008/0106101 A1* | 5/2008 | North et al. | | 290/53 |
| 2008/0238103 A1* | 10/2008 | Montgomery | | 290/53 |

OTHER PUBLICATIONS www.aw-energy.com, Publication Date: Unknown.

* cited by examiner

GENERATOR AND METHOD FOR GENERATING ELECTRICITY FROM SUBSURFACE CURRENTS

BACKGROUND OF THE INVENTION

1. Field of the Invention

The present invention relates to converting subsurface currents into electricity and, in particular, to conversion using a coil and magnetic element.

2. Description of Related Art

It is the experience of many who have gone to the seashore and stood in the water perhaps 10-50 yards from the water's edge that there is an extremely powerful alternating inflow and outflow of water 1-5 feet beneath the surface. This ebb and flow of water occurs about 4 times per minute and has tremendous kinetic energy.

In the past 50 years a number of different devices have been designed to try to harness the kinetic energy of moving ocean water in usable ways.

Tidal

Some energy conversion devices have relied on positioning at flood plains, such as those at the Bay of Fundy on the eastern coast of Canada or St. Malo on the Brittany Coast in France (across the La Rance Estuary). In these locations, there is a powerful inflow of water for a period of perhaps a few hours followed by a similar outflow of water for a similar period of time ("the tide comes in" and "the tide goes out") each twice daily. Machinery at these locations requires huge capital investments, dam constructions, and other unsightly changes to the natural beauty of the sea.

Current

Some energy conversion devices have relied on positioning at the mouth of rivers or in the path of well-known ocean currents (really "current" generators erroneously called "tidal" generators) to supply a steady one-way directional source of moving water to turn turbines and other devices that then generate electricity.

These first two types of devices generally employ underwater propeller-like turbine wheels of various kinds to either generate electricity directly, or to mechanically transfer the turbine motion to a surface generator, or to run a pump to elevate water and thereby allow it to be used at some future time in a way similar to the generation of electricity at a hydroelectric dam.

Wave

Recently, instead of turbines, snake-like devices have been designed that feature multiple hinges (See New York Times Aug. 3, 2006, Pages C1 and C4) to allow the water to "whip" the device as it floats on the ocean's surface. These devices are not located to take advantage of subsurface back and forth motion of water, but rather are positioned as floating machinery miles off shore. They are surface wave devices. The motion at the joints of the device is harnessed to power small electric motors. Current designs of this device ride on the surface of the ocean where they are visible; not below the surface. These snake-like devices must be anchored to the ocean floor to work efficiently and to prevent them from drifting into land and being damaged. They are very confined mechanical devices that will eventually undergo fatigue and break.

Other wave energy conversion devices depend on buoys that contain magnets and float on the ocean surface within vertical cylindrical canisters that are in turn wrapped with copper wire. A linear electric generator is effectively created generating electricity by the action of fluctuating magnetic fields within the coil of copper wire. These are also wave machines that are positioned out to sea and do not take advantage of the subsurface back and forth motion of water. This method relies upon the "choppiness" of the surface water to operate efficiently; if the ocean is "calm", only small amounts of electricity are generated.

Geothermal

Geothermal devices are used to harness the energy of underwater volcanoes and pipes driven deep into the ocean floor. These devices convert thermal energy and not mechanical energy into electricity.

Energy conversion patents include U.S. Pat. Nos. 1,439,984; 3,696,251; 4,291,234; 4,843,249; 4,864,152; 5,105,094; 5,440,176; 6,020,653; 6,729,744; 6,955,049; 7,012,340; and 7,042,112. See also www.aw-energy.com (unknown publication date) and "Permanent magnet fixation concepts for linear generator" by Oskar Danielsonn, et. al. Uppsala University, UPPSALA (unknown publication date).

SUMMARY OF THE INVENTION

In accordance with the illustrative embodiments demonstrating features and advantages of the present invention, there is provided a generator for converting into electricity the energy from subsurface currents having horizontally moving components. The generator has a submergible electrical coil adapted to allow subsurface currents to enter and flow axially through the coil. Also included is a support adapted to engage a sea floor and to support and orient the electrical coil to allow horizontal components of subsurface currents to produce an axial flow through the coil. The generator also includes a magnetic shuttle mounted to longitudinally reciprocate in the coil, driven by water flowing through the coil.

In accordance with another aspect of the invention, a method is provided that employs a magnetic shuttle and an electrical coil for converting into electricity the energy from subsurface currents having horizontally moving components. The method includes the step of submerging the electrical coil above a sea floor to allow horizontal components of subsurface currents to produce an axial flow through the coil. The method includes the step of placing the magnetic shuttle in the coil to longitudinally reciprocate, driven by water flowing through the coil.

In accordance with yet another aspect of the invention, a method is provided that employs a plurality of magnetic shuttles and a parallel plurality of electrical coils. The method can convert into electricity the energy from subsurface currents having horizontally moving components. The method includes the step of submerging the electrical coils above a sea floor to allow horizontal components of subsurface currents to produce an axial flow through the coils. Another step is allowing subsurface currents to enter and flow axially through the coils. The method includes the step of placing the magnetic shuttles separately into a corresponding one of the coils to longitudinally reciprocate, driven by water flowing through the coils.

By employing apparatus and methods of the foregoing type, an improved generator and method of generating electricity is achieved. In a disclosed embodiment the interior of a hollow plastic shuttle is fitted with a number of longitudinally oriented magnets. A plurality of parallel guide rods surround the shuttle and fit into longitudinal grooves on its outside. These guide rods are supported by a plurality of longitudinally spaced collars mounted in a frame.

Encircling the guide rods between the collars are a number of aligned iron or stainless steel sleeves. Electrical coils are wound around the outside of each of the sleeves and connected in series to form a linear generator. Specifically, subsurface water currents drive the shuttle and its magnets through the electrical coils to induce a voltage. The polarity of the voltage alternates and can be rectified by a full wave bridge located onshore.

In one embodiment this series of electrical coils forms an electrical generator located in one column of a rectangular support frame that also supports a number of identical parallel generators located in adjacent columns. This frame with its multiple generators is rotatably mounted on a vertical beam together with, for example, two more identical frames each having multiple generators.

This beam is mounted on a sea floor at a distance from the shoreline where subsurface currents are fairly strong. The multiple frames mounted on the vertical beam can be azimuthally adjusted so the shuttles of the linear generators are strongly driven by the subsurface currents.

Current from the generators may be sent by cable to an onshore rectifying station. There the alternating current can be rectified into a DC current that is either stored or immediately dispatched to a load or to a local electrical grid.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION OF THE PREFERRED EMBODIMENTS

Figure 1:
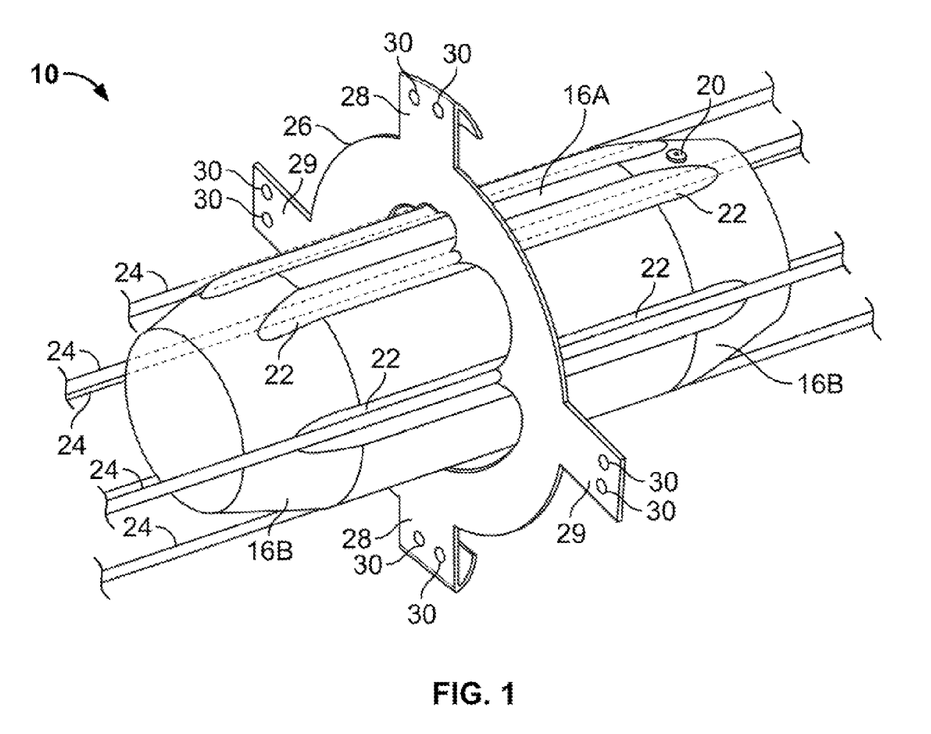
FIG. 1 is a perspective view of a portion of a generator that may be used to generate electricity in accordance with principles of the present invention.
Figure 2:
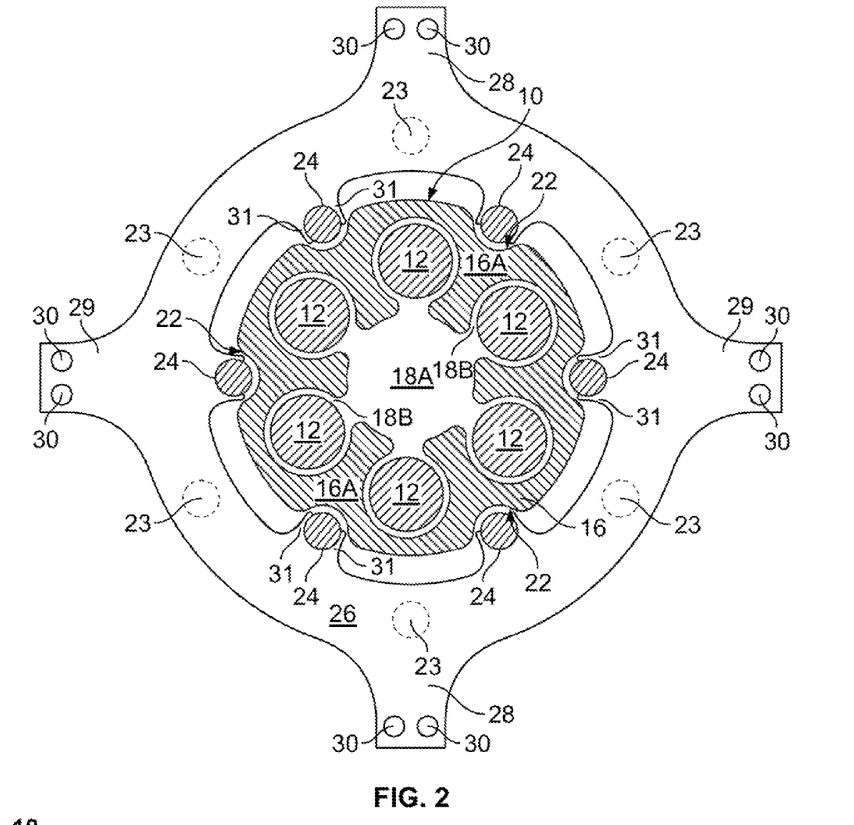
FIG. 2 is an end view of the apparatus of FIG. 1, partly in section.
Figure 3:
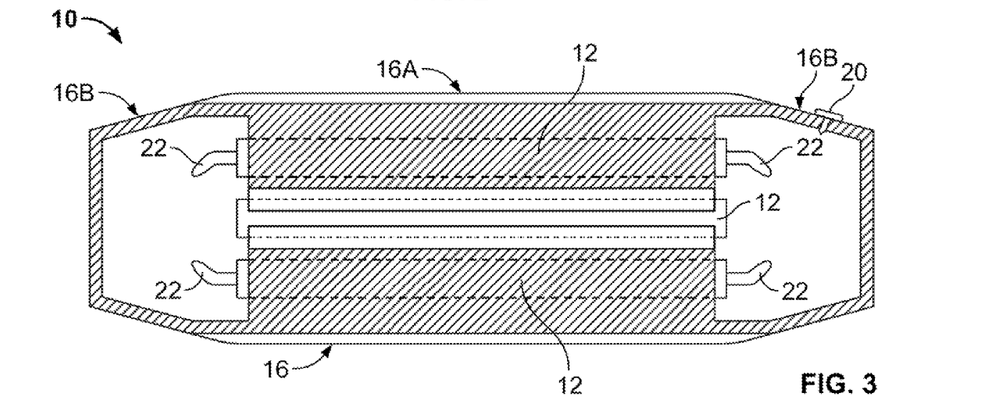
FIG. 3 is a longitudinal sectional view of the shuttle of FIG. 1.

Referring to FIGS. 1-3, shuffle 10 has a generally cylindrical midsection 16A between tapered frustoconical ends 16B (collectively referred to as case 16). Cylindrical midsection 16A has a central chamber 18A with six cylindrical cavities 18B circumferentially and equiangularly spaced about the longitudinal axis of shuttle 10.

Cylindrical cavities 18B each hold a cylindrical magnetic element 12. Elements 12 are rods made of rare earth magnets (or other magnetic material) oriented with all their north-south poles oriented in the same way. Magnetic elements 12 are in the illustrated embodiment approximately 4 inches (10 cm) in diameter and 3.5 feet (1 m) in length. In some embodiments, magnetic elements 12 may have a different size and shape, such as triangular or rectangular prisms with a different overall size. Consequently, cavities 18B may have alternative complementary shapes and sizes to accommodate different magnetic elements.

The outer surface of midsection 16A has six equiangularly spaced longitudinal grooves 22 that extend partially into frustoconcial ends 16B. The depth of each groove 22 is substantially consistent along the length of midsection 16A. Grooves 22 become increasingly shallow as they extend along the tapered surfaces of ends 16B before terminating approximately half way.

Each frustoconical end 16B has an interior cavity that communicates with central cavity 18A. Case 16 is integrally molded of transparent hard plastic but may be made of other materials as well. In this embodiment, case 16 is approximately 4 feet (1.22 m) in length and 15 inches (38 cm) in diameter, but in other embodiments may be sized differently. The case 16 of shuttle 10 may be assembled from two or more parts to facilitate disassembly and maintenance of shuttle 10, including the retrieval of magnetic elements 12 from a worn or damaged case.

A valve 20 is located in one of frustoconcial ends 16B. Valve 20 may be used to evacuate the inside of shuttle 10 or introduce a gas, such as helium or nitrogen to render shuttle 10 substantially buoyant-neutral when submerged.

Referring to FIGS. 1 and 2, collar 26 is an annulus with six pairs of opposing fingers 31 circumferentially spaced about the inner diameter of the collar. The fingers 31 of each pair protrude inward and curve together thereby forming a circular receptacle for holding guide rods 24 (which will be described in further detail hereinafter).

Two substantially rectangular mounting flanges 29 protrude in opposite directions horizontally. Two additional mounting flanges 28 protrude in opposite vertical directions. When viewed edgewise, lower flange 28 appears J-shaped and upper flange 28 appears inverted J-shaped. Located in each of the four mounting flanges 28 and 29 are a pair of fastener holes 30 for mounting collar 26 in a manner to be described presently. Collar 26 may be made of a flexible composite material but may be made of other materials such as plastic or aluminum.

Figure 4:
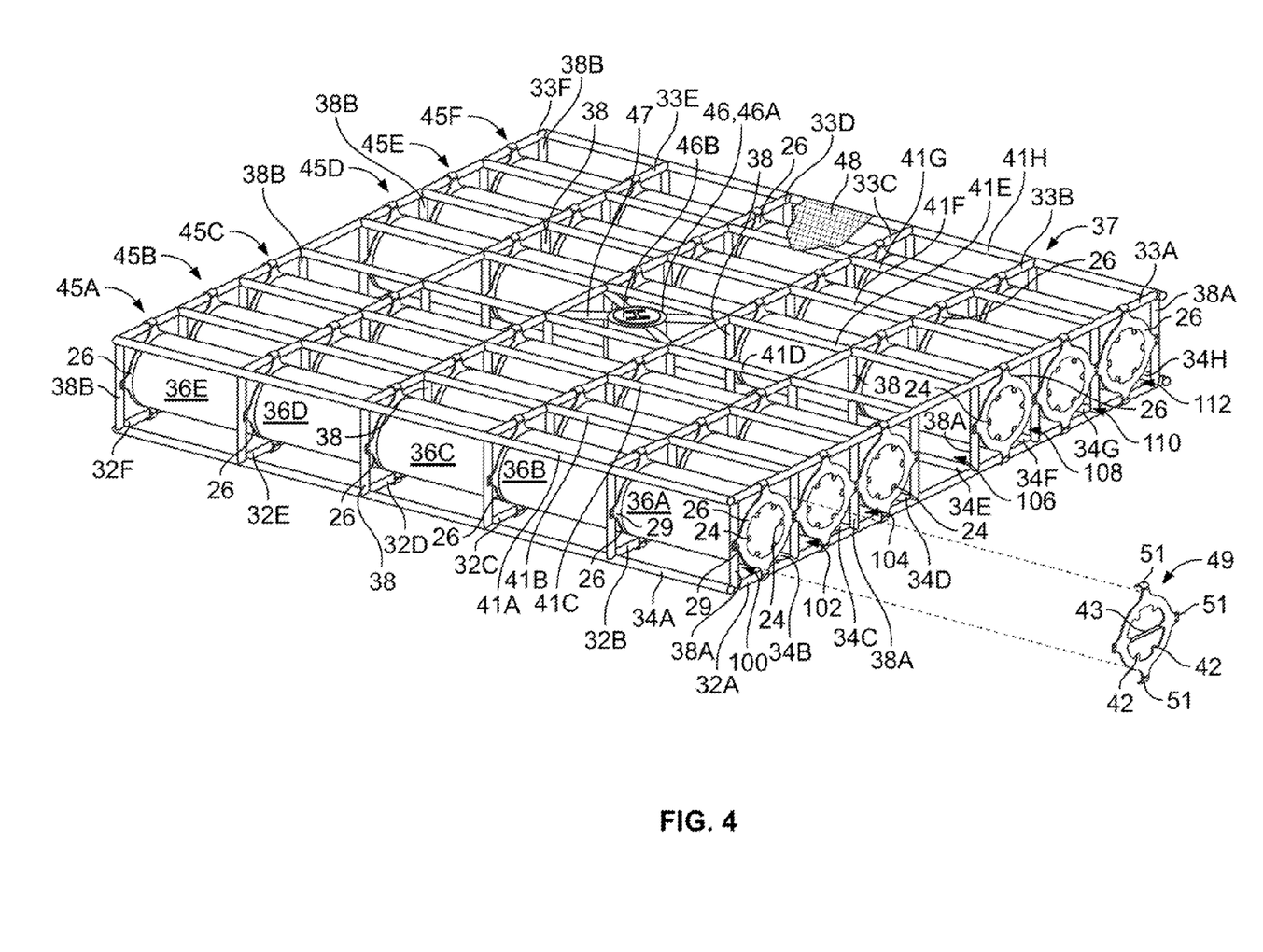
FIG. 4 is a perspective view of the apparatus of FIG. 1 fitted with a coil and replicated to form a plurality of generators mounted in a frame.

Referring to FIG. 4, frame 37 is constructed with an upper rectangular grid made of eight parallel, evenly spaced, longitudinal members 41A-41H intersecting six parallel, evenly spaced, transverse members 33A-33F. Frame 37 also has a lower rectangular grid with eight, parallel, evenly spaced, longitudinal members 34A-34H intersecting six, parallel, evenly spaced, transverse members 32A-32F. The upper and lower grids are similar, each having matching intersections interconnected by upright members 38, with (a) the uprights on one side distinguished as upright members 38A and (b) the uprights on the opposite side distinguished as upright members 38B. These intersections and upright members 38 (and 38A and 38B) may be connected by welding, bolting, fastening brackets, or other means.

Longitudinal members 41A-41H and 34A-34H are made of square or round non-magnetic stock approximately 15 feet (4.6 m) in length. Transverse members 32A-32F and 33A-33F are also made of similar stock approximately 12 feet (3.7 m) in length. These lengths are merely exemplary.

Arranged in this fashion, frame 37 has seven transversely spaced, longitudinal columns 100, 102, 104, 106, 108, 110, and 112 each divided into 5 longitudinally spaced segments forming five rows delineated by transverse members 33A-33F (and members 32A-32F).

Previously mentioned collar 26 is installed on the two vertical members 38A, the bottom member 32A, and the top member 33A in column 100 in the following manner: The two J-shaped flanges 28 are flexible enough to spread open and snap over members 32A and 33. Flanges 28 and as well as flanges 29 are then fastened to frame 37 using screws inserted through openings 30 of the flanges, although other fastening means are contemplated such as bolts, rivets, adhesive, etc. (Note, fastening of one of the flanges 29 may be deferred until installation of its neighboring collar, at which time a common fastener can be used for both.)

In a similar manner five more collars 26 may be installed in column 100 on transverse members 33B-33F, 32B-32F, and vertical members 38, and 38B. Coil segments 36A-36E will be installed in column 100 between collars 26 in a manner to be described presently.

Figure 5:
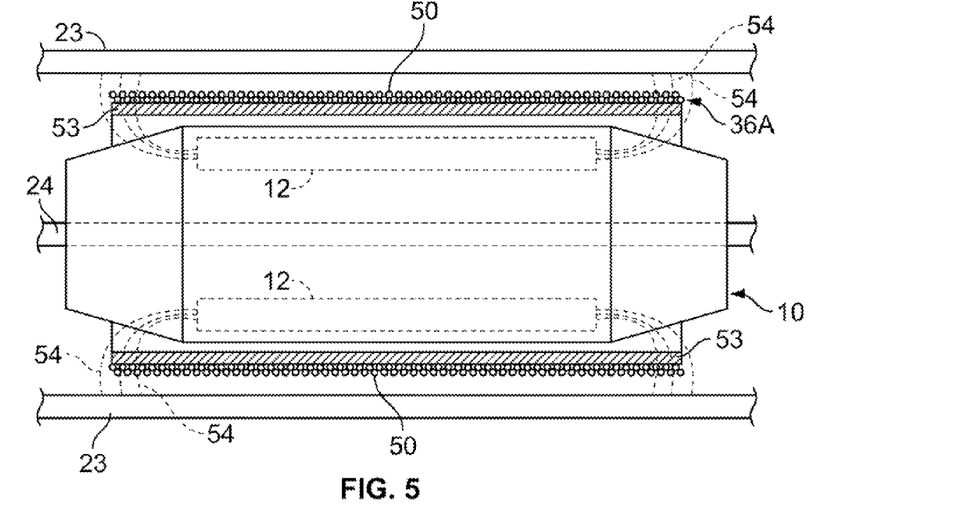
FIG. 5 is a detailed side view of a fragment of the apparatus of FIG. 4, partly in longitudinal section.

Referring to FIG. 5, coil segment 36A of FIG. 4 is represented schematically (coil segments 36B-36F of FIG. 4 being identical). Coils segment 36A is approximately 3 feet (0.9 m) long and is formed of multiple turns of Formvar coated copper wire 50 wound about cylindrical iron sleeve 53, which has an inside diameter of approximately 16.5 inches (42 cm). In various embodiments, different insulations may be used and the wire gauge can be adjusted as needed (smaller gauge numbers tending to be more efficient).

Optional low reluctance cylindrical rods 23 that serve as flux return paths are circumferentially spaced about coil 50. (In FIG. 4 these rods 23 are shown in phantom.) Rods 23 are radially spaced from and parallel to magnetic elements 12 of shuttle 10. Rods 23 are approximately 2 inches (5.1 cm) in diameter and 15 feet (5.7 m) in length but may be other sizes as well. Rods 23 are made of stainless steel but may be made of other low reluctance materials possibly having a protective coating to withstand prolonged submersion in ocean water.

Lines of flux 54 project from magnetic rods 12 and magnetize iron sleeve 53 to have the same north-south orientation. These lines of flux curve outward crossing numerous turns of wire 50 before traveling through low reluctance rods 23 (or through ambient if no return rods are used). Lines of flux 54 extend longitudinally through rods 23 before curving inward and re-entering the magnetic rods 12. In embodiments where rods 23 are not used, lines of flux 54 may curve outward a greater distance from rod 12 as they flow between the north and south poles of rod 12.

Referring again to FIGS. 2 and 4, coil segment 36A is placed in column 100 between the two longitudinally spaced collars 26 mounted on transverse members 32A and 32B. Each of six guide rods 24 are then inserted between each pair of fingers 31 of the collar 26 attached to transverse member 32A. These six rods 24 are then pushed through coil 36A to slide into the space between each pair of fingers 31 of the collar 26 mounted on transverse member 32B. Coil segment 36B is then placed between the collars 26 mounted on transverse members 32B and 32C. Each of rods 24 are then pushed through coil segment 36B and between each pair of fingers 31 of collar 26 on member 32C. The process is repeated for coil segments 36C-36E.

Rods 24 can be further secured with mounting brackets (not shown) or by being welded or glued in place. Guide rods 24 are in this embodiment 2 inches (5.1 cm) in diameter and 15 feet (4.6 m) long. Rods 24 are sized to engage grooves 22 of shuttle 10 and are made of composite material but may be made of other non-ferromagnetic materials as well.

Shuttle 10 is then inserted into coil segment 36A through the collar 26 mounted on member 32A. Grooves 22 of shuttle 10 ride on guide rods 24. (Note that in some embodiments, more than one shuttle 10 may be inserted.)

Previously mentioned low reluctance rods 23 (shown also in FIG. 5) may be optionally installed in column 100 by inserting them through openings 23 in collars 26. Some embodiments will have a number of rods different from six or the rods may be replaced with a cylindrical sleeve Annular end plate 49 is designed to overlay collar 26 on member 32A. End plate 49 has four substantially rectangular mounting flanges 51 protruding radially outward therefrom at the 3, 6, 9 and 12 o'clock positions. One of four tabs 42 protrude inwardly to cover the ends of four of the six guide rods 24. A cross bar 43 covers the other two guide rods 24 and keeps shuttle 10 from leaving frame 37. End plate 49 is made of a composite material but may be made of other materials such as plastic or steel. An additional a similar endplate (not shown) is placed over the collar 26 on member 32F.

The foregoing process of inserting rods 24, placing coil segments 36A-36E, inserting optional return rods 23, inserting shuttle 10, and attaching end plates 40 is repeated for columns 102, 104, 108, 108, 110 and 112, resulting in two sets of three linear generators 45A-45F (column 106 is left open for reasons to be described presently).

While five are shown, the number of coil segments forming each of the linear generators 45A-45F may be a different number, typically in the range of two to ten segments. Also, while six are shown, the number of linear generators may be different, typically in the range of two to ten generators.

Figure 6:
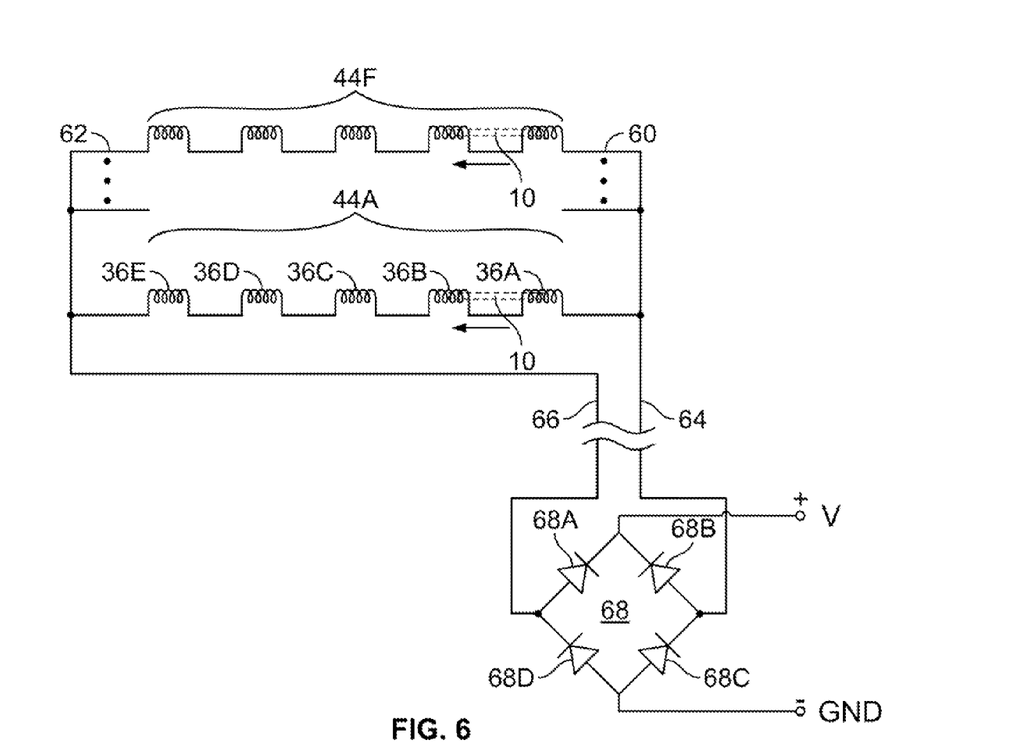
FIG. 6 is a schematic diagram showing the interconnection of coils of FIG. 4 to an onshore rectifier.

Referring to FIG. 6, the previously mentioned coil segments 36A-36E of linear generator 45A are schematically shown connected in series to form an electrical coil. The coil segments of the other linear generators 45B-45D are similarly connected but only generator 44F is specifically illustrated. Linear generators 45A-45E are connected in parallel across cables 64 and 66. In some embodiments, the linear generators 44A-44F may be connected in series.

Cables 64 and 66 travel typically from 50 to 300 (15 to 91 m). feet to onshore rectifier bridge 68. Cable 66 is connected to the cathode of diode 68D and the anode of diode 68A. Terminal +V is connected to the cathodes of diodes 68A and 68B. Conductor 64 is connected to the anode of diode 68B and the cathode of diode 68C. Terminal GND is connected to the anodes of diodes 68C and 68D.

Referring again to FIG. 4, a detent mechanism 46 is located in column 106 between transverse members 33C and 33D (as well as members 32C and 32D). Mechanism 46 has an outer race 46A attached through four diagonal supports 47 to the intersections of longitudinal members 41D and 41E and transverse members 33C and 33D. Mechanism 46 is also connected through four additional supports (not shown but similar to supports 47) to the intersections of longitudinal members 34D and 34E and transverse members 32C and 32D.

Mechanism 46 has an inner race 46B with an I-shaped opening extending through it vertically. The outer race 46A of mechanism 46 may rotate relative to the inner race 46B before being locked in a desired position. Detent mechanism 46 may alternatively be a lockable, ratcheting mechanism or other lockable device that allows rotation about at least one axis when unlocked and prevents rotation when locked.

Frame 37 is covered on all sides with a wire screen 48 (partially shown) except for gaps for detent mechanism 46. The mesh of screen 48 is sized to allow ocean water to flow freely in and out of frame 37 while avoiding the entry of small ocean life.

Figure 7:
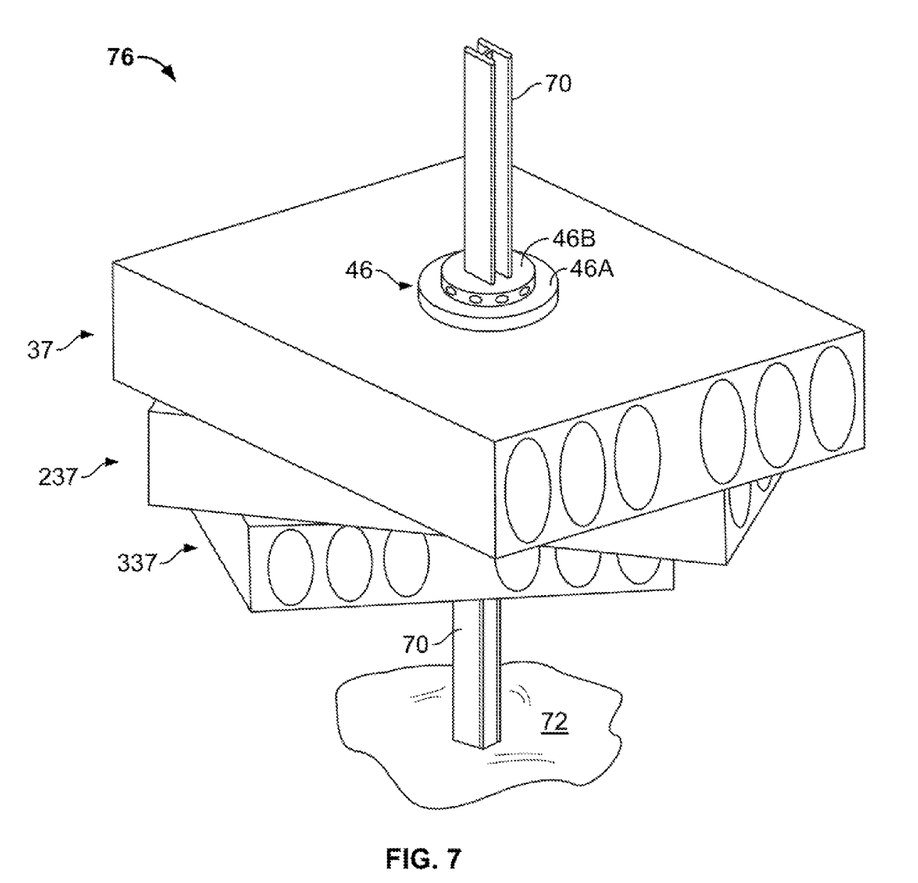
FIG. 7 is a perspective view of a number of frames in accordance with FIG. 4 rotatably mounted on an upright beam.

Referring to FIG. 7, I-beam 70 protrudes from a concrete footing in sea floor 72. I-beam 70 is made of steel but may alternatively be made of other non-paramagnetic material such as aluminum or composites. Previously mentioned frame 37 is stacked together with two other identical frames 237 and 337 on beam 70, so the beam extends through the I-shaped openings located in the inner race 46B of frame 37 as well as the inner races (not shown) for frames 237 and 337. The inner race of frame 337 rests on a flange (not shown) welded on a lower portion of beam 70.

Each of frames 37, 237 and 337 is adjusted azimuthally so that the longitudinal axes of the linear generators (generators 45A-45F of FIG. 4) are aligned with the subsurface currents at their location and depth. The longitudinal axes of the generators may be horizontal or somewhat off horizontal to accommodate subsurface currents. In general the subsurface currents will be primarily horizontal or if diverted from horizontal (either long term or transiently) will have a large horizontal component. This large horizontal component ensures that subsurface current will flow into the coils of the linear generators (even if the generators are not exactly horizontal) to drive the shuttle therein.

The three frames 37, 237 and 337 on beam 70 are collectively referred to as a generator array 76. Although array 76 is described having three frames 37, 237 and 337, a different number of frames may be installed on beam 70 limited only by the height and strength of I-beam 70.

Figure 8:
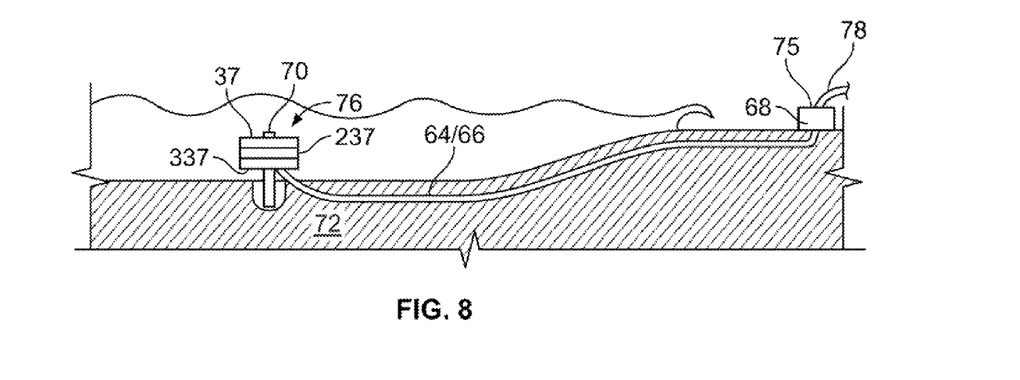
FIG. 8 is an elevational view of the apparatus of FIG. 7 mounted on a sea floor and connected by a cable to an onshore rectifier.

Referring to FIG. 8, generator array 76 is shown secured on sea floor 72 approximately 50 to 300 feet (15 to 91 m) from the high water mark on the shore line. The output of each frame of array 76 is electrically connected through cables 64/66 to onshore rectifier bridge 68 (see rectifier bridge 68 of FIG. 6) located in building 75. In some cases the outputs of the frames may be connected in series, but parallel connections are contemplated as well. The DC output of the rectifier bridge 68 is transmitted on cable pair 78.

To facilitate an understanding of the principles associated with the foregoing apparatus, its operation will be briefly described in connection with FIGS. 4-8. I-beam 70 (FIG. 7) is mounted in sea floor 72 at a predetermined location from a shoreline where the waves produce a back and forth subsurface current of ocean water. The depth and distance where beam 70 is located should be such that its top is submerged most of the time, only occasionally breaking the surface to become visible. The distance of beam 70 from the mean high water mark of the shoreline is typically in the range of 50 to 300 feet (15 to 91 m).

The frames 37, 237, 337 are mounted on beam 70 at an elevation where the back and forth subsurface currents are strong. This usable region typically begins one to two feet above sea floor 72 and extends to the surface and even slightly beyond.

Each of frames 37, 237, 337 is adjusted azimuthally so that the longitudinal axes of their linear generators 45A-45F are aligned with the back and forth subsurface current of ocean water. Each frame 37, 237, and 337 (FIG. 8) in the array 76 can be directed at different rotational angles from their neighbor. The entire apparatus is open enough to allow the free flow of ocean water in all directions. The subsurface current causes each of the six shuttles 10 located in each of frames 37, 237, 337 to reciprocate within their linear generators (e.g. generators 45A-45F of FIG. 4).

Incoming waves cause the subsurface ocean currents to impinge on shuffle 10 located in coil segment 36A (FIG. 4) of linear generator 45A (it will be appreciated that similar remarks apply to generators 45B-45F). The impinging ocean current builds hydraulic pressure which urges shuttle 10 toward adjacent coil segment 36B. The neutral buoyancy of shuttle 10 allows it to travel with its grooves 22 sliding along guide rods 24 from coil segment 36A toward coil segment 36B with a minimal amount of friction.

Referring to FIGS. 5 and 6, movement of shuttle 10 causes lines of flux 54 to move relative to coil segment 36A thereby causing a current to flow therein. The induced current flows from terminal GND through diode 68C, conductor 64, and coil segment 36A. The current continues, flowing through coil segments 36B-36E to conductor 66, through diode 68A to terminal +V. Similar current flow occurs as shuttle 10 travels through coils 36B-36E in succession before shuffle 10 is stopped by end plate 49 (FIG. 4) or reversed by a reversing current.

The reverse water current now impinges on the opposite end of shuttle 10 now located in coil segment 36E (or an earlier coil segment), urging it to move toward segment 36A. The movement of shuttle 10 causes lines of flux 54 to move relative to coil segment 36E thereby causing a current to flow therein. The induced current flows from terminal GND through diode 68D, conductor 66, and coil segment 36E. The current continues, flowing through coil segments 36A-36D to conductor 64, through diode 68B to terminal +V. Similar current flow occurs as shuttle 10 travels through coils 36A-36D before shuttle 10 is stopped by end plate 49 (FIG. 4) or reversed by a reversing current.

Terminals +V and GND may be connected to a variety of electrical devices to store or condition the voltage generated by array 76. Electrical "gas stations" near the coast can then use this energy directly to charge the plug-in electric cars of the future. Alternatively, since the electrical flow never stops, large storage batteries can be charged during periods when consumer demand is low, such as during the middle of the night. In addition, this varying flow can be directed into an electrical grid to decrease its need to burn coal, oil, natural gas, or nuclear fuel. The varying flow could also be used to power units that generate hydrogen for future cars and even power the new machines that clean the atmosphere of thousands of tons of carbon dioxide per day.

This submerged location of array 76 is out of the view of all observers, including those concerned about the despoiling of natural beauty and scenic views of the seashore. The apparatus generates no carbon dioxide byproducts, nor any other form of hydrocarbon pollution. It generates no harmful radiation. It has no moving mechanical parts beyond the primary electrical generating mechanism of the shuttles 10 floating back and forth, thereby optimizing mechanical efficiency. The machine generates electricity 24 hours per day, 7 days per week, 365 or 366 days per year.

To generate electricity, array 76 only requires waves to produce a subsurface back and forth current of ocean water. It is known that winds blowing somewhere over the ocean within 150-200 miles of array 76 cause waves that can travel to the location of array 76 without substantial loss. Since wind is almost always blowing somewhere over the ocean within 150-200 miles of array 76 it can generate electricity regardless of:

1. whether the ocean surface is substantially tranquil or is buffeted by hurricane conditions;
2. whether the tide is coming in, going out, or somewhere in between;
3. whether the sun is brightly shining or obscured by clouds; and
4. and whether the local wind is blowing or not.

"Farms" consisting of thousands of generator arrays 76 each can be politically positioned anywhere along the coasts, especially around off-shore islands, that are not utilized by the tourist industry for seashore recreation. The more violent the reciprocating flows of water around craggy rocky coasts, the more electricity is generated.

Hooking large numbers of these arrays 76 together, conceivably even thousands of them in an area of several miles of seacoast, would also effectively eliminate the fluctuations produced by any one array.

Obviously, many modifications and variations of the present invention are possible in light of the above teachings. It is therefore to be understood that within the scope of the appended claims, the invention may be practiced otherwise than as specifically described.

The invention claimed is:

1. A generator for converting into electricity the energy from subsurface currents having horizontally moving components, comprising:
a submergible electrical coil adapted to allow subsurface currents to enter and flow axially through said coil;
a support adapted to engage a sea floor and to support and orient said electrical coil to allow horizontal components of subsurface currents to produce an axial flow through said coil; and
a magnetic shuttle mounted to longitudinally reciprocate in said coil driven by water flowing through said coil.

2. A generator according to claim 1 wherein said shuttle is neutral buoyant.

3. A generator according to claim 2 comprising:
an onshore rectifier for rectifying current from said coil.

4. A generator according to claim 2 wherein said shuttle comprises:
a gas filled case; and
one or more magnetic elements mounted in said case.

5. A generator according to claim 4 wherein said case has opposite frustoconical ends.

6. A generator according to claim 4 wherein said one or more magnetic elements comprise a plurality of magnetic rods.

7. A generator according to claim 1 comprising:
a frame for guiding said shuttle, said frame having a screen.

8. A generator according to claim 1 comprising:
a frame having a plurality of guide rods for guiding said shuttle.

9. A generator according to claim 8 comprising:
a plurality of longitudinally spaced collars mounted on said frame and supporting said guide rods.

10. A generator according to claim 9 wherein said coil comprises:
an interconnected plurality of coil segments, said collars being interleaved with said coil segments.

11. A generator according to claim 1 comprising:
a primary frame having a plurality of guide rods, said magnetic shuttle including a primary plurality of cases, each of said cases having a plurality of grooves each slidably engaging one of said guide rods.

12. A generator according to claim 11 comprising:
a second frame having a plurality of guide rods, said magnetic shuffle including a second plurality of cases, each of said cases having a plurality of grooves each slidably engaging one of said guide rods.

13. A generator according to claim 12 wherein said primary frame and said secondary are stacked and supported by said support to rotate azimuthally.

14. A generator according to claim 1 wherein said coil is supported by said support to rotate azimuthally.

15. A generator according to claim 1 wherein said coil is twice as long as said shuttle.

16. A generator according to claim 1 wherein said coil is three times as long as said shuttle.

17. A method employing a magnetic shuttle and an electrical coil for converting into electricity the energy from subsurface currents having horizontally moving components, the method comprising the steps of:
submerging the electrical coil above a sea floor coil to allow horizontal components of subsurface currents to produce an axial flow through said coil;
placing the magnetic shuttle in said coil to longitudinally reciprocate driven by water flowing through said coil.

18. A method according to claim 17 comprising the step of: adjusting the shuttle to be neutral buoyant.

19. A method according to claim 17 comprising the step of: rectifying current from said coil.

20. A method according to claim 17 comprising the step of: azimuthally adjusting the coil to increase capture of energy.

21. A method according to claim 17 wherein said shuttle is given freedom to reciprocate along a path more than twice as long as said shuttle.

22. A method according to claim 17 wherein said shuttle is given freedom to reciprocate along a path more than three times as long as said shuttle.

23. A method employing a plurality of magnetic shuttles and a parallel plurality of electrical coils for converting into electricity the energy from subsurface currents having horizontally moving components, comprising the steps of:
submerging the plurality of electrical coils above a sea floor to allow horizontal components of subsurface currents to produce an axial flow through said coils; and
placing the magnetic shuttles separately into a corresponding one of said coils to longitudinally reciprocate driven by water flowing through said coils.

* * * * *